(No Model.)  3 Sheets—Sheet 1.

G. H. GRIMM.
SUGAR EVAPORATOR.

No. 296,743. Patented Apr. 15, 1884.

WITNESSES

INVENTOR
Gustave H. Grimm
By Leggett & Leggett
ATTORNEYS (No Model.)  3 Sheets—Sheet 2.
G. H. GRIMM.
SUGAR EVAPORATOR.
No. 296,743.    Patented Apr. 15, 1884.
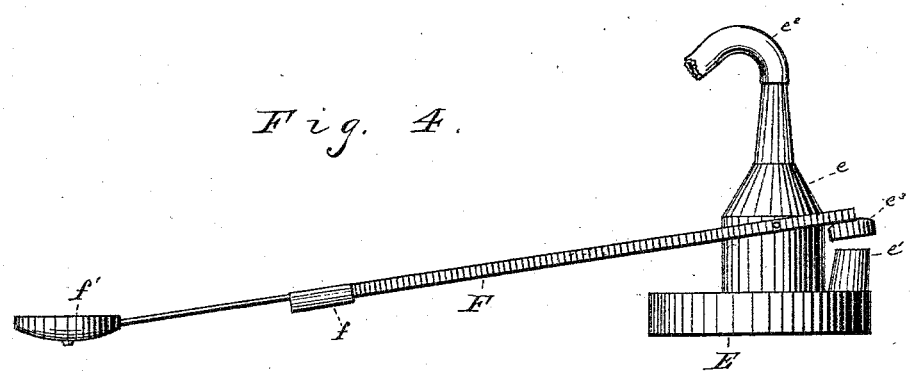
Fig. 4.
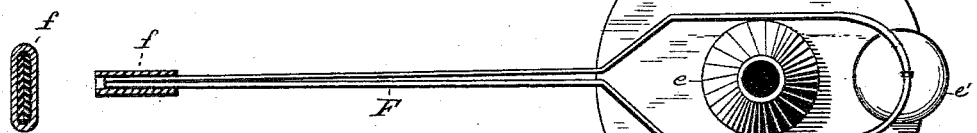
Fig. 5.
Fig. 6.    Fig. 7.
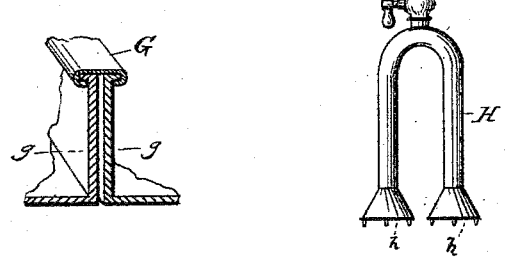
Fig. 8.
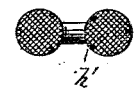
WITNESSES    Gustave H. Grimm INVENTOR
            By Leggett & Leggett
                                ATTORNEYS
N. PETERS, Photo-Lithographer, Washington, D. C.

(No Model.)  3 Sheets—Sheet 3.
G. H. GRIMM.
SUGAR EVAPORATOR.
No. 296,743. Patented Apr. 15, 1884.
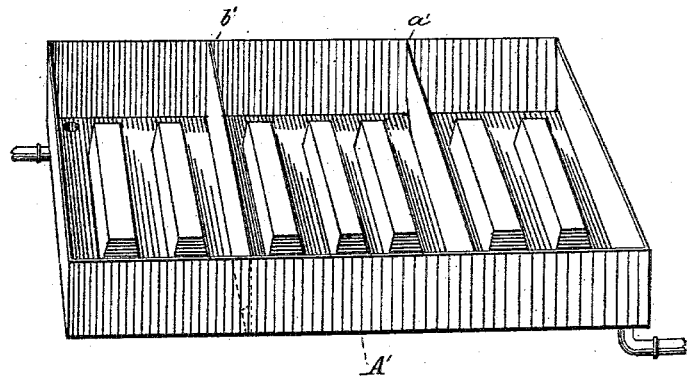
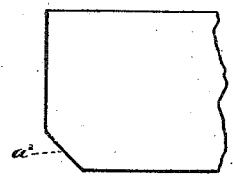
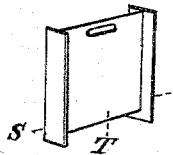
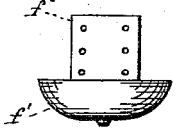
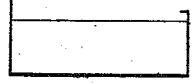
WITNESSES
INVENTOR
Gustave H. Grimm
By Leggett & Leggett ATTORNEYS United States Patent Office.

GUSTAVE H. GRIMM, OF HUDSON, OHIO.

SUGAR-EVAPORATOR.

SPECIFICATION forming part of Letters Patent No. 296,743, dated April 15, 1884.

Application filed April 6, 1883. (No model.)

*To all whom it may concern:*

Be it known that I, GUSTAVE H. GRIMM, of Hudson, in the county of Summit and State of Ohio, have invented certain new and useful Improvements in Sugar-Evaporators; and I do hereby declare the following to be a full, clear, and exact description of the invention, such as will enable others skilled in the art to which it pertains to make and use the same.

My invention relates to sugar-evaporators; and it consists of parts and combinations of parts, more fully hereinafter described.

The object of my invention is to improve a former device on which Letters Patent No. 254,476 were granted to me in March, 1882, to which reference is made in this specification.

Figure 1:
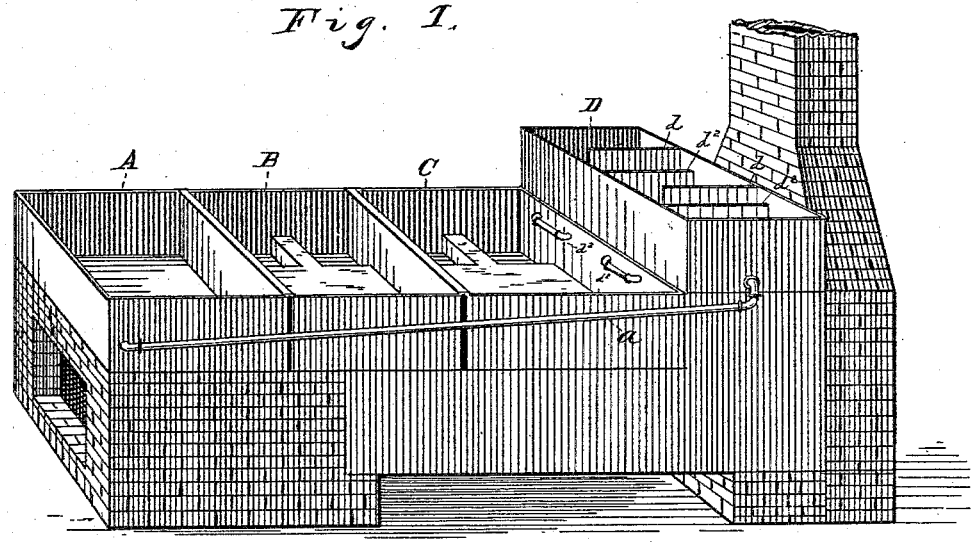
Figure 2:
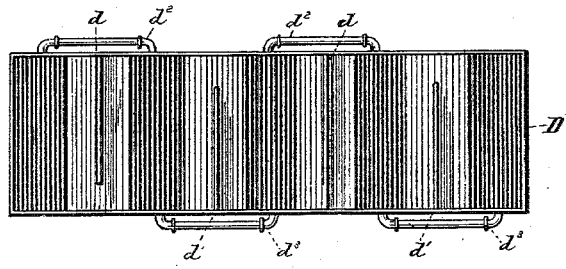
Figure 3:
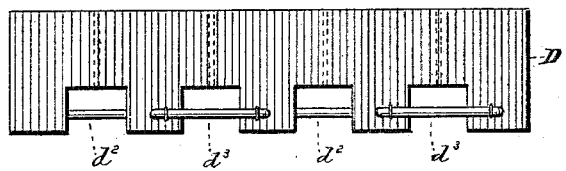

In the drawings, Figure 1 is a view in perspective of evaporating-pans and sitting, and showing also a heater, which is one portion of my new device. Fig. 2 is a plan view, and Fig. 3 is a side elevation, of said heater. Fig. 4 is a side elevation of a stop-valve and attachments operating in said heater. Fig. 5 is a top view of the same. Fig. 6 is a view in perspective of my new device for coupling the pans. Fig. 7 is a side elevation of my new device for a portable siphon for operating said pans. Fig. 8 is a bottom end view of the same. Fig. 9 is a view in perspective of a pan with a corrugated bottom with my new device of partitions attached. Fig. 10 is a detailed view of a portion of the device shown in Fig. 9. Figs. 11 and 12 show my new device for attaching a lever to a float. Fig. 13 is an end view of a shallow pan with one broad side for attaching to a deeper pan. Fig. 14 represents a vertical removable partition held in a central position in the corrugations of the heater by the wings of the partition extending into the corners of the same. The partition extends from the top of the heater to near the bottom of the corrugations.

In the drawings, A, B, and C represent a system of evaporating-pans, that may be extended to any number of pans that are desired, and are set over an arch arranged as shown in my former device aforesaid.

D represents a heater receiving the juices that are to be evaporated direct from the vessels in which they are stored, and controlling by an automatic device, hereinafter described, the flow of said juices, so that the heater will always contain a suitable quantity, and will in turn discharge into said pans a constant and sufficient supply. The heater is also designed to aid the pans by heating the said juices before they are discharged into said pans, and to accomplish this by utilizing the heat that is passing from the pans to the chimney, and would otherwise be wasted, and the said heater may be placed in any position best adapted to secure this end. The heater is made with a corrugated bottom, and free circulation from one corrugation to another is obtained by a system of tubes attached from one corrugation to another, but alternately on different sides of the heater, as shown in Fig. 3, by the tubes $d^2$ on one side and the tubes $d^3$ the other side of the heater.

In order still further to insure an equal circulation, a system of wings is provided attached to the tops of said corrugations. These wings are somewhat less in length than the width of the heater, and are attached to the two sides alternately, as shown in Fig. 2. It will be seen that the passage-way at the end of each wing and the passage-way through the tube directly under it are at opposite sides of the heater.

At one end of the heater is attached a pipe, as at $a$, for conveying the juices from the heater to the said pans. In the other end of the heater is placed the device for controlling automatically the supply of said juices directly to the heater and indirectly to the entire system of pans. This device is shown in the enlarged detailed drawings, Figs. 4 and 5.

E represents a broad, shallow vessel provided with a discharging-outlet, $e'$, and provided also with the vertical chamber $e$, terminating in an end suitable for applying a supply-tube, preferably flexible, as at $e^2$. To the sides of the chamber is pivoted the lever F, as shown in Fig. 5. To the short arm of the lever is attached the stop or valve $e^3$, having its seat on the outlet $e'$. To the long arms of the lever is attached a sleeve, $f$, holding together the two parts of the lever F, and keeping them in place on the pivots aforesaid. To the sleeve $f$ is attached, by means of a rod, the float $f'$.

As the device is designed to operate in a small depth of liquid, the float is made broad and shallow. It is found that a float having a flat bottom and resting on or near the bottom of the heater will be operated on and kept in a vibratory state by the action of the steam generated under the float. To obviate this difficulty, I make a slight teat or point on the bottom of the float, so that the said float will not come in too close contact with the bottom of the heater; and I also make the bottom of the float convex, so that the steam may pass from under it without any disturbance of the parts. It is desirable to catch and retain in this device as much as possible of the sediment and refuse matter contained in the said juices. For this purpose I make the container E as broad as practicable, and I also make the chamber $e$ large in proportion to the tube $e^2$, so that the current through the chamber may not be so strong as to interfere with the deposit of sediment in the container E. This part of the device may also be provided with a strainer, if desired.

By removing the sleeve $f$ the two parts of the lever F may be spread apart, disengaging the said pivots, freeing the lever and attachments from the balance of the device. This will be found convenient in packing the valve $e'$ and in discharging the sediment from the vessel E.

In my former device chairs were used between the pans to prevent the escape of heat between the pans; but it was found difficult to remove a single pan when necessary for repairs or other purposes. My new device for this purpose is shown in Fig. 6. The sides of the pans are extended slightly above the ends, and are flanged or turned at right angles and toward the inside of the pan. A sleeve made in the shape as shown at G is placed over the adjacent flanges of the pans whose sides join, and the two pans are thus securely held in contact and the heat prevented from passing between them; also, the said sleeve, extending, as it does, a short distance over the pans, prevents the liquid from boiling over from one pan into another. The liquid as it is forced upward along the side of the pan in the boiling process is encountered by the projections of the sleeves, and thereby given such direction that it falls back into its own pan. By removing these sleeves any pan can be removed without disturbing the other pans.

In my former device the siphons for conveying the liquid from one pan to another were made portable without inversion or emptying by means of cups surrounding the ends of the siphon-tubes. In my new device I accomplish the same end by covering the ends of the siphon-tube with a fine gauze or strainer, preferably of wire, that performs the same function as the cups in making the siphons portable as aforesaid, and which has the additional advantage of straining the liquid in its passage from one pan to another. I enlarge the ends of the siphon-tubes, to give greater capacity to the strainer, and I also attach small points at the bottom, to prevent a too close contact with the bottom of the pan. My new device is shown in Figs. 7 and 8.

In my former invention patented, as aforesaid, the pan over the front part of the arch was shown with the central portion of the bottom corrugated, the said corrugations running lengthwise of the arch. Such a pan, to which are also attached my new improvements, is shown at A′ in Fig. 9. For the purpose of securing better circulation in this pan, and also for the purpose of giving better support to the bottom of the pan, I have devised the partitions $a'$ and $b'$, extending between the corrugations and dividing the pan into rectilinear spaces, each space containing one or more corrugations, and the said partitions may be increased to any desired number. These partitions are each firmly attached to the bottom of the pan, and also the ends of the partitions are attached to the sides of the pan, thus giving the required support to the pan. At the lower corner of the back end of the partition $a'$ is an orifice, made, preferably, by clipping this corner of the partition, as shown at $a^2$, Fig. 10. The partition $b'$ has a similar orifice at the lower corner of the front end. These orifices are for securing the proper circulation in the pan. If, for instance, the sap were fed into the right-hand front corner, it would flow to the back end of the pan and through the said orifice in the partition $a'$, thence forward and through the orifice in the partition $b'$, thence again to the back end of the pan, where it would be discharged into another receptacle.

To the float $f'$, as shown in Fig. 4, may be attached a vertical strip of metal, $f^2$, with two vertical rows of holes, as shown in Fig. 11. The rod that attaches the sleeve $f$, Fig. 4, to said float with its attachment, as shown in Fig. 11, may be made with a forked end, as shown at $f^3$ in Fig. 12, for engaging said holes. The prongs should be made of a greater or less distance apart than the distance between the two rows of holes, so that the prongs will have to be sprung slightly in order to enter any pair of holes, and the elasticity of the prongs will hold the parts in position. By placing the prong in the different sets of holes the liquid in the heater may be gaged to different depths, as may be required. As the holes in the plate $f^2$ are somewhat larger than the prong $f^3$, the plate $f^2$ is not held rigid, but can rock sufficiently, so that the said float may always retain the said plate in a vertical position.

It is found that the pan over the fire—that is, at the front of the arch, as A in Fig. 1, or A′, Fig. 9, whichever kind is used—will require to be about nine inches deep, to keep the sap from boiling over, while the pans back of the front one only require to be about four inches deep. Much material may be saved by making these back pans shallow and extending only one side up to a width as great as the depth of the front pan, as shown in the end view, Fig. 13. By turning the wide side of the second pan next to the front pan and the narrow side of the third pan next to the second pan, and so on, they may all be coupled together by sleeves, as shown at G, Fig. 6.

It is found that the pan (usually the back one) in which the process of reducing the juices to sirup is completed will soon become coated on the bottom with a sediment or deposit, and that if this is allowed to remain it will discolor the product. When this occurs, I remove this pan and place another pan, of which there should be at least one extra, in its place. The pan coated with a deposit, as aforesaid, should be suspended at any convenient place, not over the arch, where the warm sap from the heater will flow into it, and thence be discharged by siphon or other means into the front pan. This action of the warm sap will dissolve the deposit, so that it can easily be removed from the pan, leaving this pan in condition to be again returned to its place over the arch when it is required.

I have thus described my system of pans and the different devices attached in such a manner as to enable persons with little experience in the business to successfully operate them. When large quantities of sap are to be evaporated, it will be better to use the pan A', Fig. 9, in place of the pan A, Fig. 1, and also to increase the length of the arch and the number of pans beyond what is shown in Fig. 1.

In Fig. 14, T represents vertical partitions with the wings S attached, that hold them in central positions in their respective corrugations. The liquid, as it passes from one part of the heater to another, must pass down under the bottom of each partition, thus keeping the liquid thoroughly mixed.

What I claim is—

1. In an evaporating apparatus, the combination, with a heater, D, having a corrugated or depressed bottom, of the wings $d, d, d'$, and $d'$, extending alternately nearly across the same from opposite sides, and the tubes $d^2, d^2, d^3$, and $d^3$, connecting said corrugated or depressed portions together, and arranged on opposite sides, substantially as shown and for the purpose set forth.

2. In a system of evaporating-pans, the sleeve G, coupling the pans in such a manner that any pan can be removed without disturbing the other pans, and preventing the liquid from boiling over from one pan to another, substantially as and for the purpose set forth.

3. In an evaporizing apparatus, the combination, with a heater, of the container E, the enlarged chamber $e$, the double lever F, and the sleeve $f$, substantially as and for the purpose shown and described.

4. In a system of evaporating-pans provided with siphons for conveying liquid from one pan to another, a covering of gauze or other suitable material placed over the ends of the siphon-tube, making the siphon portable without reversing, and also straining the juice in its passage from one pan to another, substantially as and for the purpose shown and described.

5. The combination, with the float $f'$, of the vertical perforated plate $f^2$ and the forked lever $f^3$, substantially as shown and described.

6. In a system of evaporating-pans provided with a deep pan in front and pans of less depth in the rear, the shallow pans made with one broad side suitable for attaching to the deep pan, thus making the rear pans interchangeable, and saving material in the construction of the shallow pans, substantially as and for the purpose set forth.

7. In the process of sugar-evaporating, the removing of a pan from the arch when it has become coated with deposit, and so placing it that the warm sap will flow through it in some part of the process, thereby dissolving the sediment or deposit, so that it can easily be removed from the pan, substantially as described, and for the purpose specified.

8. In a system of evaporating-pans provided with a heater, the combination, with the tubes $d^2$ and $d^3$, of the removable partitions T, that may be used in any or all of the corrugations of the heater, substantially as shown and described.

In testimony whereof I sign this specification, in the presence of two witnesses, this 19th day of December, 1882.

GUSTAVE H. GRIMM.

Witnesses:
S. G. NOTTINGHAM,
GEORGE F. DOWNING.